United States Patent
Tsai et al.

(10) Patent No.: US 11,543,981 B2
(45) Date of Patent: Jan. 3, 2023

(54) DATA STORAGE DEVICE SELF-CONFIGURING BASED ON CUSTOMER PREDICTION MODEL

(71) Applicant: Western Digital Technologies, Inc., San Jose, CA (US)

(72) Inventors: Chun S. Tsai, Tustin, CA (US); Dean V. Dang, Fountain Valley, CA (US); Jillian D. Passioukov, Irvine, CA (US); Colin W. Morgan, Mission Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 211 days.

(21) Appl. No.: 16/900,639

(22) Filed: Jun. 12, 2020

(65) Prior Publication Data

US 2021/0389889 A1   Dec. 16, 2021

(51) Int. Cl.
*G06F 3/06* (2006.01)
*G06Q 10/06* (2012.01)
*G06N 20/00* (2019.01)
*G06N 5/04* (2006.01)

(52) U.S. Cl.
CPC .......... *G06F 3/0632* (2013.01); *G06F 3/0604* (2013.01); *G06F 3/0679* (2013.01); *G06N 5/04* (2013.01); *G06N 20/00* (2019.01); *G06Q 10/06315* (2013.01)

(58) Field of Classification Search
CPC ...... G06F 3/0632; G06F 3/0604; G06N 20/00
See application file for complete search history.

(56) References Cited

U.S. PATENT DOCUMENTS

| | | | |
|---|---|---|---|
| 6,163,773 A | 12/2000 | Kishi | |
| 6,954,326 B2 | 10/2005 | Bement et al. | |
| 8,941,943 B1 | 1/2015 | Coker et al. | |
| 9,244,832 B1* | 1/2016 | Sherman | G06F 12/0246 |
| 9,489,145 B2 | 11/2016 | Coker et al. | |
| 9,959,209 B1 | 5/2018 | Burton et al. | |
| 10,522,185 B1 | 12/2019 | Hall | |
| 2012/0096225 A1* | 4/2012 | Khawand | G06F 12/0848 711/119 |
| 2015/0206067 A1 | 7/2015 | Abu-Mostafa et al. | |
| 2016/0292591 A1 | 10/2016 | Guirguis et al. | |
| 2019/0273789 A1* | 9/2019 | Modarresi | H04L 67/22 |

* cited by examiner

*Primary Examiner* — Baboucarr Faal
(74) *Attorney, Agent, or Firm* — Patterson & Sheridan, LLP; Steven H. VerSteeg

(57) ABSTRACT

A data storage device is disclosed comprising a non-volatile storage medium (NVSM), and control circuitry configured to receive a plurality of access commands, process the plurality of access commands using a customer prediction model to predict a customer of the data storage device, wherein the customer prediction model is trained off-line based on access patterns of a plurality of different customers. The control circuitry then configures access to the NVSM based on the predicted customer.

19 Claims, 8 Drawing Sheets

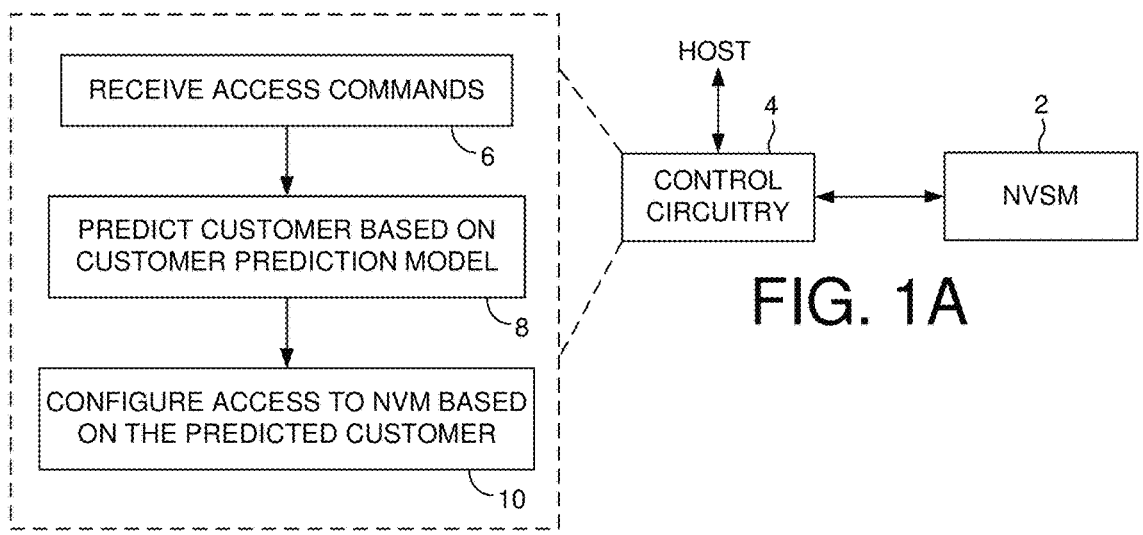
FIG. 1A
FIG. 1B
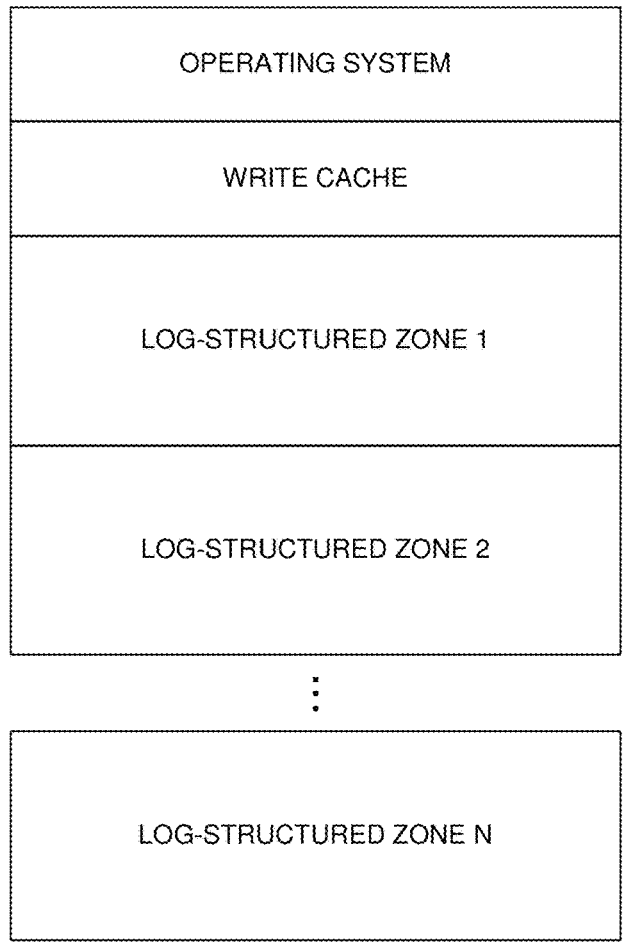
FIG. 2

FIG. 7A

| L S Z | L S Z | L S Z | L S Z | L S Z | L S Z | L S Z | L S Z | L S Z | L S Z | L S Z | L S Z | L S Z | L S Z | L S Z | L S Z |
|---|---|---|---|---|---|---|---|---|---|---|---|---|---|---|---|
| AU | | | | AU | | | | AU | | | | AU | | | |

FIG. 7B

| L S Z | L S Z | L S Z | L S Z | L S Z | L S Z | L S Z | L S Z | L S Z | L S Z | L S Z | L S Z | L S Z | L S Z | L S Z | L S Z |
|---|---|---|---|---|---|---|---|---|---|---|---|---|---|---|---|
| AU | | | AU | | | AU | | | AU | | | AU | | | |

FIG. 7C

| L S Z | L S Z | L S Z | L S Z | L S Z | L S Z | L S Z | L S Z | L S Z | L S Z | L S Z | L S Z | L S Z | L S Z | L S Z | L S Z |
|---|---|---|---|---|---|---|---|---|---|---|---|---|---|---|---|
| AU | | | | AU | | | | | AU | | | | | | |

| L S Z | L S Z | L S Z | L S Z | L S Z | L S Z | L S Z | L S Z | L S Z | L S Z | L S Z | L S Z | L S Z | L S Z | L S Z | L S Z |
|---|---|---|---|---|---|---|---|---|---|---|---|---|---|---|---|
| AU | AU | AU | AU | AU | AU | AU | AU | | | | | | | | |

30

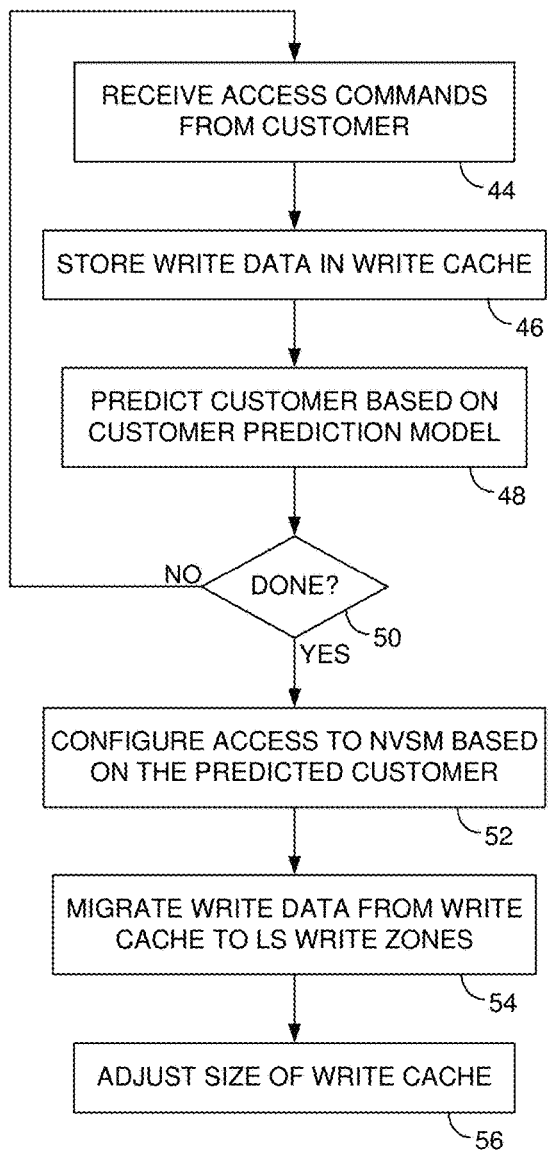
FIG. 9A
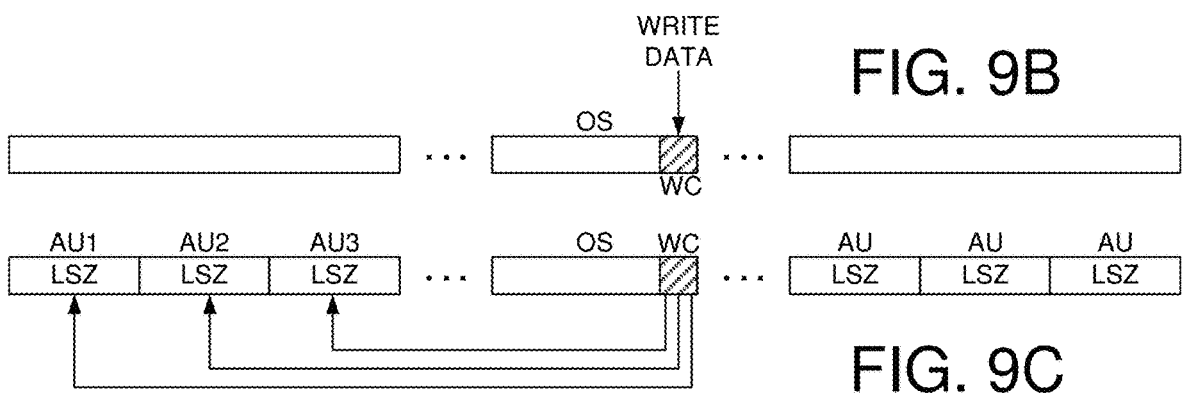
FIG. 9B
FIG. 9C

DATA STORAGE DEVICE SELF-CONFIGURING BASED ON CUSTOMER PREDICTION MODEL

BACKGROUND

Data storage devices, such as disk drives, tape drives, and solid state drives, include one or more types of non-volatile storage mediums, such as a magnetic disk, a magnetic tape, or a non-volatile semiconductor memory. The non-volatile storage mediums are typically accessed through indirect mapping wherein logical block addresses (LBA) are mapped to physical block addresses (PBA) representing contiguous segments of the storage medium. In some cases, a data storage device may implement log-structured writes wherein data received from a customer is written to the head of a write buffer defined within a zone of the storage medium. That is, the LBA of a current data block is mapped to a new PBA at the head of the write buffer which means the data stored at the old PBA is effectively "overwritten" and becomes invalid data. The PBAs storing invalid data typically remain allocated (unusable) until a garbage collection operation recovers these invalid data blocks. During a typical garbage collection operation, the valid data blocks within a write buffer may be rewritten to the head of the write buffer (or rewritten to a new write buffer), thereby enabling the resulting contiguous data blocks to be reconfigured as "free" data blocks. Since the garbage collection operations consume bandwidth that may otherwise be used to service customer access commands, it is desirable to configure a data storage device so as to reduce garbage collection operations as well as other background operations.

BRIEF DESCRIPTION OF THE DRAWINGS

FIG. 1A shows a data storage device according to an embodiment comprising a non-volatile storage memory (NVSM) configured by control circuitry.

FIG. 1B is a flow diagram according to an embodiment wherein access commands received are processed by a customer prediction model to predict a customer of the data storage device and configure the NVSM accordingly.

FIG. 2 shows an address range of the NVSM comprising a block for storing an operating system for the customer, a write cache, and a plurality of log-structured zones (LSZs).

FIGS. 7A-7D show an embodiment wherein small LSZs are predefined, and each AU is mapped to multiple of the predefined small LSZs.

FIG. 9A is a flow diagram according to an embodiment wherein the write data of write commands received from a customer are initially stored in a write cache, and once the customer has been identified, the write data is migrated to LSZs.

FIG. 9B shows an embodiment wherein when a customer first begins using a data storage device, the write data is cached in a write cache.

FIG. 9C shows an embodiment wherein after detecting the customer based on the customer prediction model, the write data is migrated from the write cache to target AUs assigned to LSZs.

DETAILED DESCRIPTION

Figure 3A:
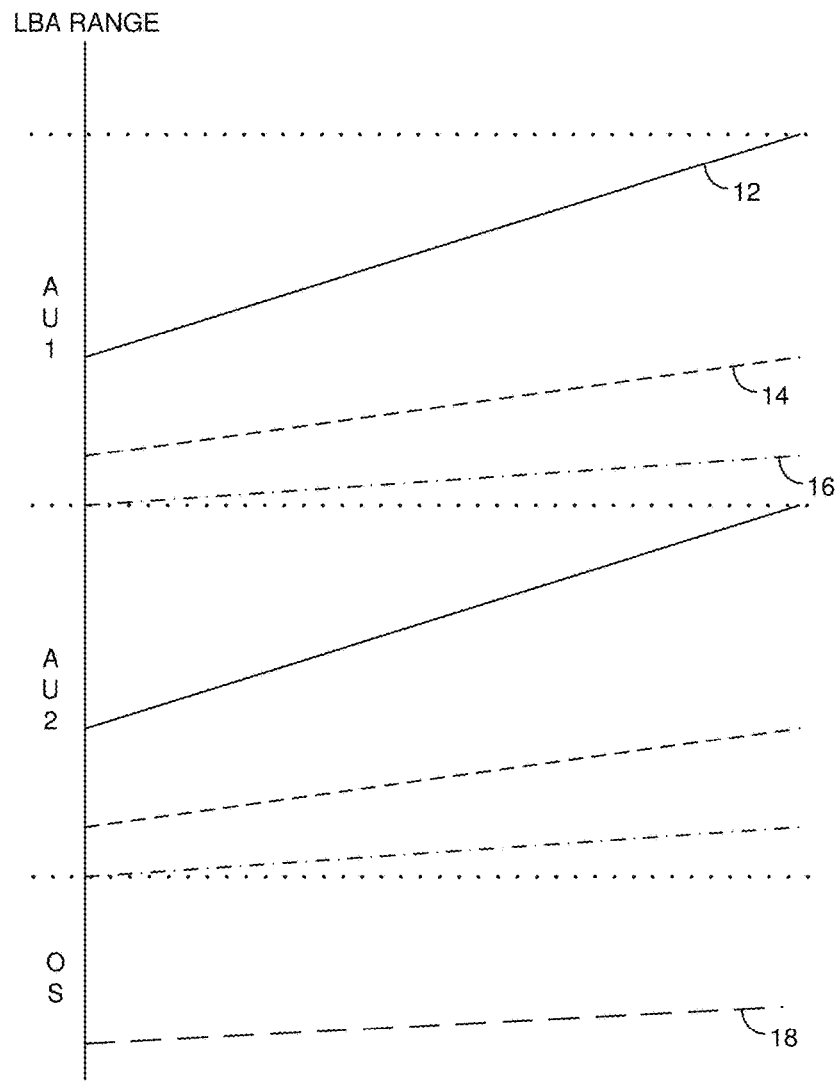
FIG. 3A shows an embodiment wherein a video surveillance customer records multiple video streams, wherein after identifying the customer the NVSM is configured accordingly, such as mapping allocation units (AUs) to minimize garbage collection.

FIG. 1A shows a data storage device according to an embodiment comprising a non-volatile storage medium (NVSM) 2 and control circuitry 4 configured to execute the flow diagram of FIG. 1B. A plurality of access commands are received (block 6) which are processed using a customer prediction model to predict a customer of the data storage device (block 8), wherein the customer prediction model is trained off-line based on access patterns of a plurality of different customers. Access to the non-volatile storage medium is then configured based on the predicted customer (block 10).

FIG. 2 shows an embodiment wherein the NVSM 2 may be segmented into different storage areas, including an area for storing an operating system (OS) for the customer, a write cache, and a number of log-structured zones (LSZs). In one embodiment, access to the LSZs as well as the size of the write cache may be configured based on the predicted customer. In examples described below, a number of different surveillance system customers may access the data storage device in a manner that is unique to each customer. For example as a surveillance camera generates a video stream, the OS of the surveillance system may record the video stream by allocating a block of LBAs referred to as an allocation unit (AU) to a current clip of the video stream. Since there are typically multiple surveillance cameras operating in parallel, the OS may allocate multiple AUs each assigned to a current clip of each video stream, wherein when the current AU is filled with video data, the OS may allocate a new AU to the video stream. As described in greater detail below, in one embodiment it is desirable for the data storage device to predict the customer and the corresponding size of the AU so that the AUs can be managed within the NVSM in a manner that avoids (or reduces) the overhead of garbage collection operations. In other examples, the data storage device may optimize the size of the write cache in order to facilitate different operating characteristics of different customers without overprovisioning the write cache (thereby maximizing the storage area reserved for the LSZs).

Conventionally, access to the NVSM has been configured by providing customized firmware within each data storage device targeted to each customer. However, providing a customized data storage device for each customer creates a manufacturing challenge in ensuring the proper version of firmware is loaded into the data storage devices shipped to each particular customer. If a customer receives a shipment of data storage devices having the wrong firmware, the customer's products may suffer impaired performance or even a catastrophic failure while operating in the field.

In one embodiment, instead of manufacturing data storage devices with customized firmware targeted to each particular customer, the data storage devices are loaded with self-configuring firmware capable of predicting which customer is utilizing the data storage device. In this manner, access to the NVSM may be self-configured by the firmware to accommodate each customer, thereby enabling a single version of the data storage device to be shipped to each customer. Once a data storage device has been installed into a particular customer's product, the firmware predicts the customer and configures access to the NVSM accordingly.

FIG. 3A shows an example of a customer using the data storage device in a video surveillance system, wherein a clip of each video stream may be assigned to a block of LBAs referred to as an allocation unit (AU) as described above. That is, a first AU is assigned to a video stream, and when the first AU is full of video data, a second AU is assigned to the video stream, and so on. FIG. 3A shows an example LBA space of the data storage device, including an LBA block assigned to the operating system (OS) and an example of two LBA blocks that define two AUs. The x-axis in FIG. 3A represents time, and so each AU shown in FIG. 3A is assigned to a respective video surveillance camera which operates in parallel to record respective video streams to the respective AUs. Also in the example of FIG. 3A, the video surveillance system may record for each camera a main video stream 12, a secondary video stream 14 (e.g., a sequence of still frames within the main video stream), and one more other auxiliary streams 16 that may be associated with the main video stream (e.g., timestamp information). The OS of the video surveillance system may also record a metadata stream 18 associated with each camera, such as information that may be extracted from the video stream (e.g., facial recognition information) and stored in a database.

Figure 3B:
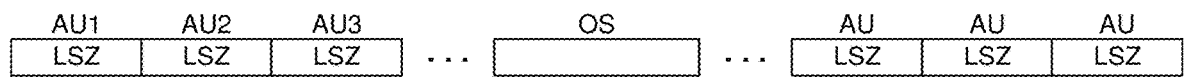
FIG. 3B shows an embodiment wherein LSZs are configured in the NVSM based on the large AUs of the customer of FIG. 3A.

In one embodiment, by detecting which customer is using the data storage device, the control circuitry 4 may configure access to the NVSM to facilitate the size of the AU allocated by the customer, thereby helping avoid or significantly reduce the overhead of garbage collection operations. In an example shown in FIG. 3B, the control circuitry 4 may define a number of LSZs each having a number of PBAs corresponding to the number of LBAs in an AU. In this manner, when part of a recorded video stream is deleted or overwritten by deleting or overwriting the corresponding AUs, garbage collection of the corresponding LSZs is avoided since all of the data stored in the LSZs is invalidated as described in greater detail below.

In one embodiment, the write data received by the data storage device (e.g., the video stream data) may be first collated by the control circuitry 4 into a write cache and later flushed to the respective AUs in order to avoid the latency associated with constantly seeking to the different AUs while the surveillance cameras are operating in parallel. Accordingly, the control circuitry 4 may configure the size of the write cache based on which customer is using the data storage device since different customers may benefit more or less by exploiting a write cache. For example, certain customers may require the write cache be flushed more frequently than other customers, for example, when the customer's products operate in a region of the world prone to power failures. Accordingly for customers requiring frequent flushes of the write cache, there may be a performance gain in defining a smaller write cache in the NVSM so that the saved storage space may be exploited in other ways (for example, by defining more LSZs).

Figure 4A:
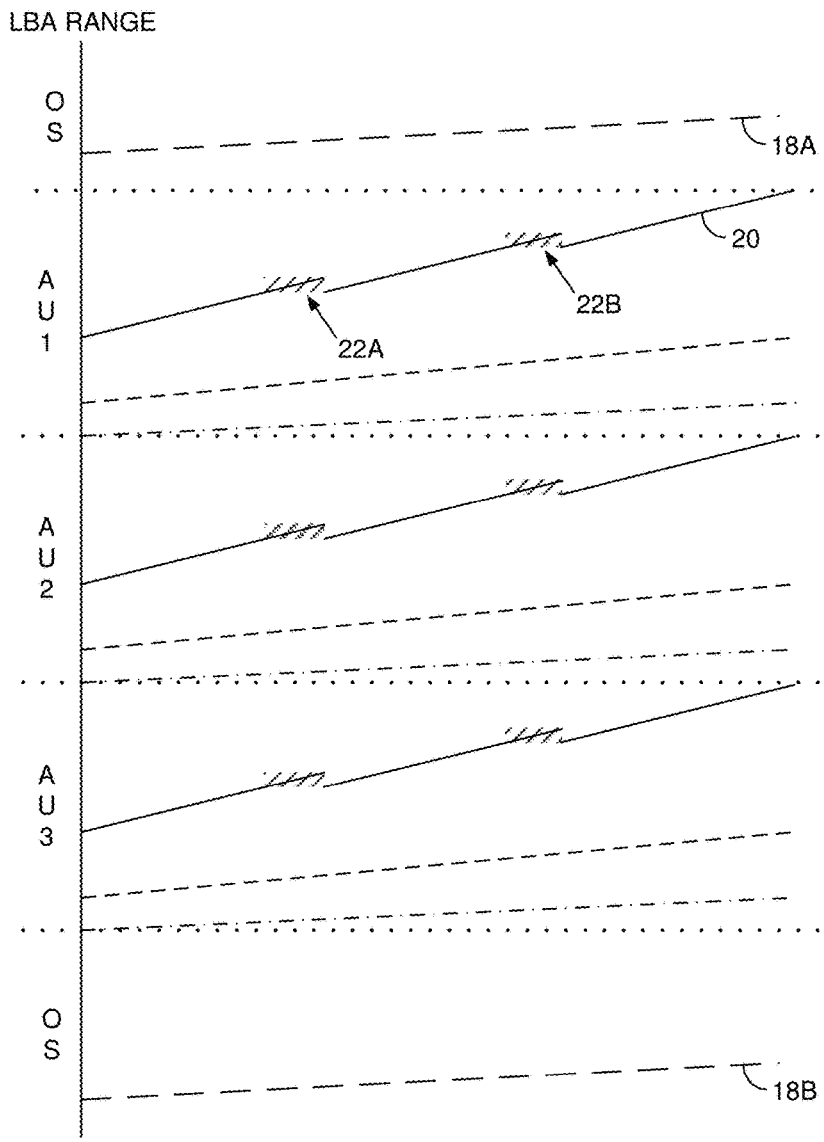
FIG. 4A shows an embodiment wherein a video surveillance customer periodically overwrites part of a video stream, wherein after identifying the customer the NVSM is configured to store the overwritten LBAs in a write cache so as to minimize garbage collection.
Figure 4B:
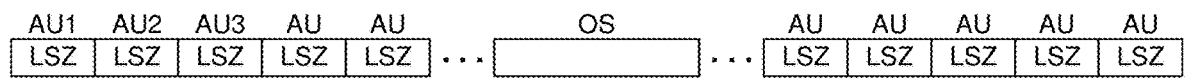
FIG. 4B shows an embodiment wherein LSZs are configured in the NVSM based on the smaller AUs of the customer of FIG. 4A.

FIG. 4A shows an example of a different video surveillance customer wherein the size of the AU defined by the customer is smaller than that defined by the customer of FIG. 3A. Accordingly as shown in FIG. 4B, the LSZs may be configured by the control circuitry 4 to match the smaller AU of the different customer (as compared to the customer of FIG. 3B). The customer of FIG. 4A also maintains multiple metadata streams 18A and 18B that are defined at different LBA ranges of the OS which may be maintained using the LSZs so as to avoid or reduce garbage collection operations. That is after detecting the customer, in one embodiment the LBA address ranges corresponding to the metadata streams (or other OS streams) for the customer may be maintained using the LSZs so as to avoid or reduce garbage collection of the streams. In the example of FIG. 4A, the customer periodically overwrites part of the main video stream (e.g., video stream 20), during intervals 22A and 22B. Accordingly once this customer is detected, the control circuitry 4 may process the LBAs to store the video stream associated with these intervals in the write cache of the NVSM 2. In this manner when the corresponding part of the video stream is overwritten, the new video data is written to the AU without leaving invalid data in the corresponding LSZ (i.e., the need to garbage collect invalid data is avoided). The example of FIG. 4A further illustrates that certain customers may benefit from a larger write cache, for example, by caching predetermined LBAs in order to avoid or reduce garbage collection operations.

Figure 5A:
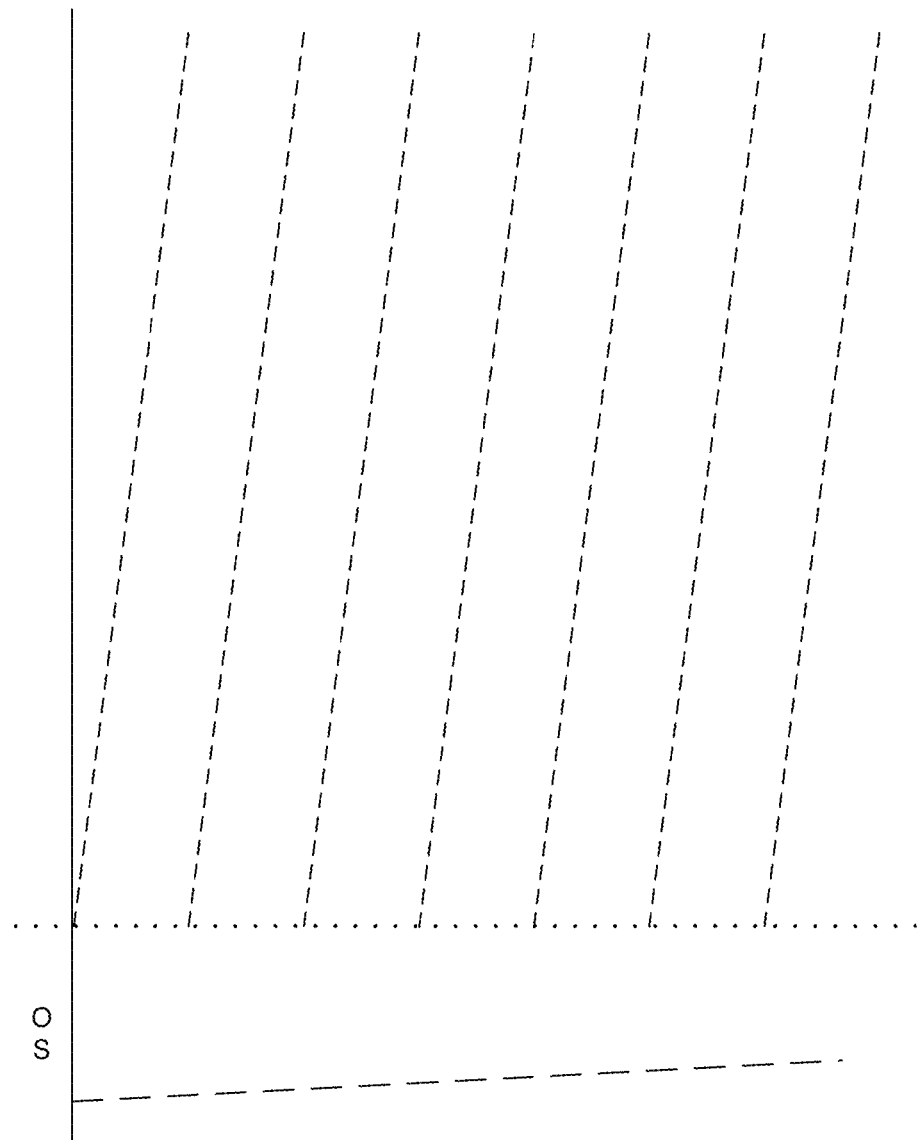
FIG. 5A shows an embodiment wherein a video surveillance customer accesses the NVSM without any discernible AUs.
Figure 5B:
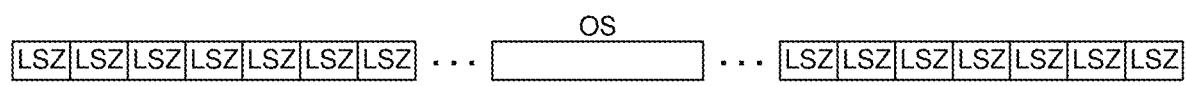
FIG. 5B shows an embodiment wherein relatively small LSZs are configured in the NVSM based on the customer of FIG. 5A.

FIG. 5A shows another example of a video surveillance customer wherein the customer accesses the NVSM without any discernible AUs. That is, certain video surveillance customers may not process the video streams by allocating AU blocks of LBAs, but may instead store the video data in an indiscernible interleaving (or even random) allocation of LBAs. For this type of customer, the control circuitry 4 may configure a minimum size LSZ (such as shown in FIG. 5B) so that the garbage collection of any given LSZ requires minimal overhead. That is, a small LSZ can be garbage collected quickly since there is a minimal amount of data within the LSZ (e.g., only a few data tracks on a disk).

Figure 6A:
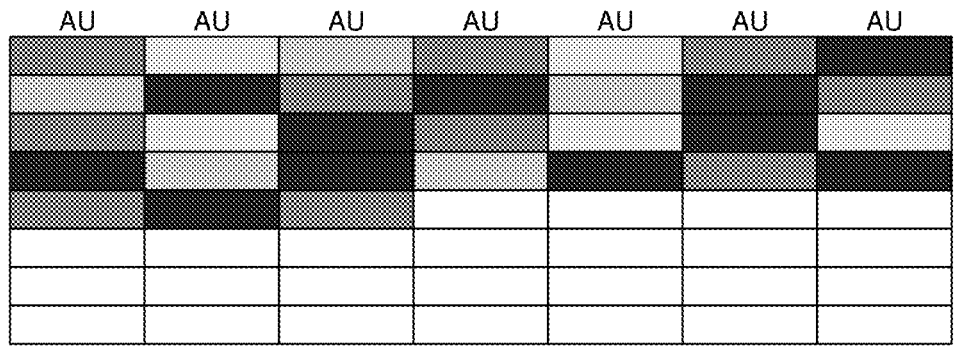
FIGS. 6A-6C show an embodiment wherein when the AU of a video stream is overwritten by assigning the AU to a new LSZ, it is unnecessary to garbage collect the old LSZ storing the overwritten LBAs since the entire LSZ is overwritten (i.e., there is no valid data to relocate).
Figure 6B:
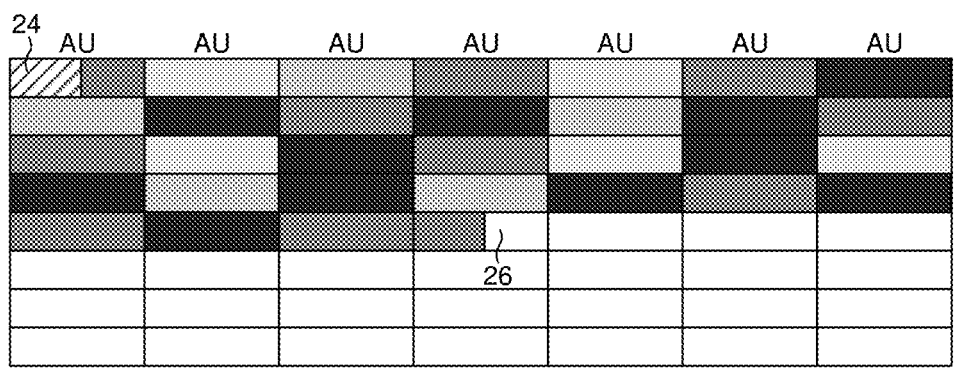
Figure 6C:
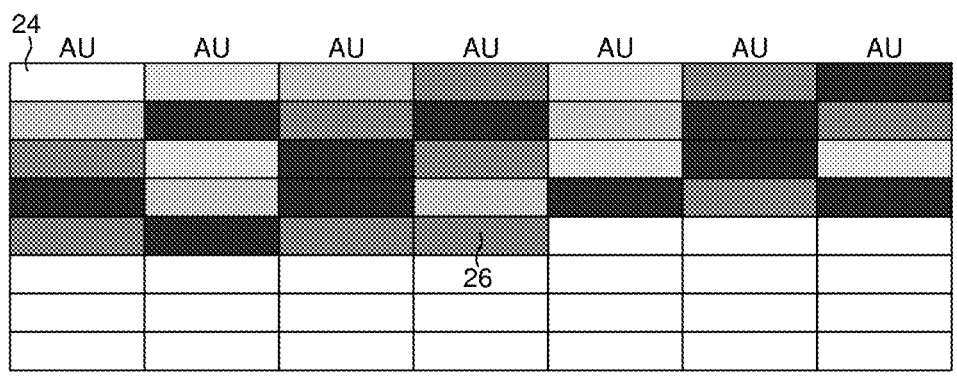

FIGS. 6A-6C show an example of how configuring access to the NVSM based on the AU size of the predicted customer helps avoid or reduce garbage collection operations that would otherwise decrease the performance. FIG. 6A shows an example section of the NVSM having been configured into a plurality of LSZs that equal the size of the AU for a particular customer. The shaded blocks in FIG. 6A represent LSZs that have been filled with customer data, such as video stream data from a video surveillance system, wherein the different shades of blocks represent AUs allocated to different data streams. In FIG. 6B, the customer begins to overwrite the LBAs of an AU mapped to LSZ 24 by writing the new data to a new LSZ 26 (i.e., the overwritten LBAs of the AU are mapped to a new LSZ 26). For example, a video surveillance system may reach the end of a recording interval and therefore "wrap" the video stream back to the beginning of the AU sequence assigned to the stream. As the new data of the LBAs is written to the new LSZ 26, the corresponding data in the old LSZ 24 is invalidated. FIG. 6C shows that when the new LSZ 26 has been filled with customer data (i.e., when all of the LBAs of the AU have been overwritten), the old LSZ 24 contains only invalid data and may therefore be converted into a "free" LSZ without needing to be garbage collected. In another embodiment, the customer may issue a TRIM command in order to "delete" the LBAs of the AU assigned to the old LSZ 24 so that the old LSZ 24 may be immediately designated as a "free" LSZ (again without needing to garbage collect the old LSZ 24).

In the embodiments described above, the LSZs are configured after predicting the customer so as to match the size of the LSZ to the size of the AU. In another embodiment, the LSZs may be preconfigured into a predetermined size prior to predicting the customer, and then after predicting the customer and corresponding AU size, each AU may be mapped to a number of the LSZs. FIG. 7A shows an example of this embodiment wherein each AU of a first customer is mapped to four LSZs (which may be contiguous), whereas in FIG. 7B each AU of a second customer is mapped to three LSZs (because the AUs of the second customer are smaller than the first customer). FIG. 7C shows an example wherein each AU of a third customer is mapped to four and one-third LSZs, and in FIG. 7D each AU of a fourth customer is mapped to one and two-thirds LSZs.

In the example of FIGS. 7C and 7D, a "runt" exists at the end of each LSZ allocated to each AU, such as runt 28 in FIG. 7C and runt 30 in FIG. 7D. In one embodiment, the runts are still used to store data, such as by allocating a number of runts to a different AU (i.e., an AU may be "built" using a number of runts). In another embodiment, the runts may be used for other purposes, such as for storing inline metadata associated with mapping the LBAs to the LSZs. In this embodiment, when the LBAs of an AU are invalidated due to be being overwritten or deleted, garbage collection of the corresponding full LSZs is avoided, whereas only the runt of the last LSZ may need garbage collection (i.e., only the runt may store valid data that needs relocating).

In the embodiments of FIGS. 7A-7D, preconfiguring small LSZs helps minimize the garbage collection overhead by minimizing the size of the runts at the end of the last LSZ assigned to an AU. However in some embodiments, there may be a minimum size of the LSZ, such as in an embodiment wherein the NVSM comprises erasable/rewritable pages of a non-volatile semiconductor memory. In an embodiment wherein the NVSM comprises data tracks of a disk, the size of the LSZ may be limited to a predetermined number of tracks so as to minimize the number of "fire break" empty tracks that act as a buffer between LSZs.

In one embodiment, the manufacturer of a data storage device may evaluate the operation of each customer product (e.g., video surveillance system) in order to determine how to configure access to the NVSM so as to optimize performance for each customer. For example, a data storage device may be configured initially into a default configuration, for example, by defining a number of small LSZs similar to FIG. 5B for storing write data received from the customer product. The access patterns of the customer may then be evaluated to determine how the firmware may be optimized for each customer, such as defining the AU size, the write cache size, the LBAs to store in the write cache, etc. In an alternative embodiment, each customer may provide the manufacturer of the data storage device with a specification as to how the customer product operates, and the firmware may be optimized for each customer based on the specification. Once the firmware has been optimized for each customer (as has been done conventionally), in one embodiment the optimized firmware for each customer is combined into a single configurable universal version of firmware that is loaded into the data storage devices that may be shipped to any customer. When the customer product begins operating, the control circuitry 4 predicts the customer using the customer prediction model, and then configures the universal version of the firmware into the version that is optimized for the predicted customer.

Figure 8:
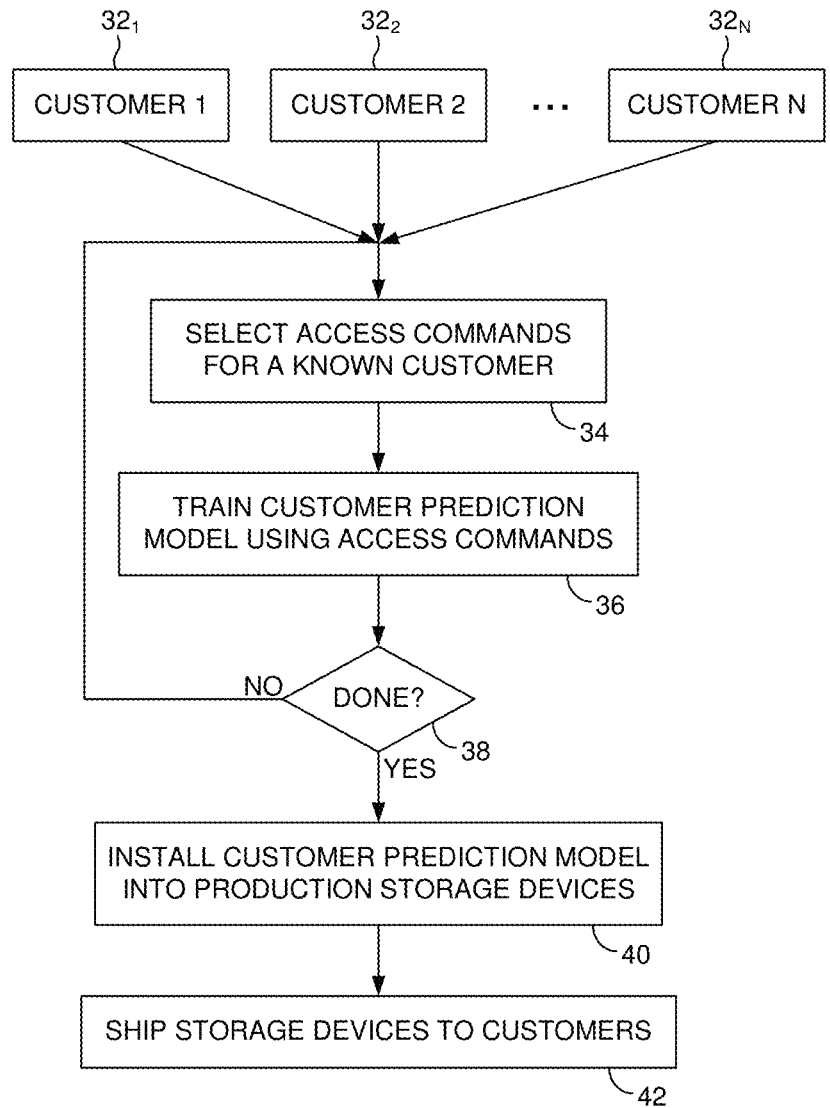
FIG. 8 is a flow diagram according to an embodiment wherein a customer prediction model is trained off-line by processing access commands generated by each of a plurality of customers.

FIG. 8 is a flow diagram according to an embodiment for training a customer prediction model off-line, for example, by the manufacturer of the data storage device. In one embodiment, the access commands generated by a number of customers 321-32N are selected (block 34) to train the customer prediction model (block 36), and in particular, the access commands generated when the customer product is first powered on since these are the access patterns that are generated when the customer product is first powered when deployed in the field. Any suitable aspect of the access commands may be used to train the customer prediction model at block 36, such as LBA ranges, block size of each command, command types (e.g., write or read), time interval associated with the commands, the specific sequence of commands, etc., including aspects of recently proposed access commands, such as the General Purpose Logging command. Further, any suitable algorithm(s) may be employed by the customer prediction model, such as a Random Forest Classifier (RFC), a Support Vector Machine (SVM), a Neural Network, or any other suitable pattern recognition and/or artificial intelligence (AI) algorithm. In addition, the customer prediction model may be trained in any suitable manner, wherein in one embodiment the access commands generated by a given customer may be time sliced into different blocks of commands, as well as time offset, in order to generate the access command patterns for training the customer prediction model at block 36. In one embodiment, once the customer prediction model has been trained to recognize the different customers (block 38), the customer prediction model is installed into each of the production level data storage devices (block 40), such as being installed as part of a universal firmware loaded into the NVSM 2. The data storage devices are then shipped to the different customers (block 42) for installation into the customer products.

FIG. 9A is a flow diagram according to an embodiment wherein when a customer product is first powered on, a plurality of initial access commands are received from the customer (block 44), wherein the write data for the write commands are stored in a write cache of the NVSM (block 46) as shown in FIG. 9B. The access commands received from the customer are processed using the customer prediction model in order to predict the customer (block 48), wherein this process may repeat at block 50 until a sufficient number of access commands have been processed to provide an accurate prediction of the customer. After having predicted the customer, access to the NVSM is configured based on the predicted customer (block 52), for example, by mapping AUs of the customer to LSZs of the NVSM as in the above described embodiments. Once access to the NVSM has been configured, the write data stored in the write cache is migrated from the write cache to a target area of the NVSM (block 54), for example, by migrating the write data to corresponding AUs of the customer as shown in the example of FIG. 9C. In one embodiment once the write data has been migrated from the write cache, the size of the write cache may be adjusted based on the predicted customer (block 56), such as by increasing the size of the write cache for customers that may benefit from a larger write cache during normal operations, or reducing the size of the write cache to increase the user data capacity for customers that require frequent cache flush operations.

In the embodiments described above, the control circuitry 4 is described as configuring certain operating characteristics when accessing the NVSM based on a predicted customer, such as the size of an AU and/or the size of a write cache for video surveillance customers. However in other embodiments, other suitable operating characteristics may be configured to improve the performance for a predicted customer, such as configuring a write caching policy that improves performance when servicing out-of-order LBA sequences that are known to occur for a particular customer. In addition, at least part of the NVSM in the above described embodiments is accessed using dynamically mapped LSZs, such as with shingled magnetic recording (SMR) of a disk drive, or regions of a solid state drive such as erase blocks; however, in other embodiments the NVSM may be accessed using a static mapping of the LBAs, such as in conventional magnetic recording (CMR), or with a combination of dynamic (e.g., SMR) and static (e.g., CMR) mapping.

In one embodiment, each customer may manufacture products having different configurations, wherein access to the NVSM may be configured based not only on the customer, but also on a particular customer configuration for a product (e.g., model of a product). A video surveillance customer, for example, may manufacturer different models of a video surveillance system having different configurations, such as a different maximum number of supported cameras. Accordingly in one embodiment, the customer prediction model may be trained at block 36 of FIG. 8 based on access commands generated by each customer, as well as access commands generated by each customer configuration.

In the embodiment described above with reference to FIG. 4A, the write cache policy of the data storage device may be configured to store the write data for certain LBAs during certain time intervals (e.g., intervals 22A and 22B) so as to avoid garbage collecting the corresponding segments of the AU when the segments are overwritten. In other embodiments, other aspects of the write cache policy may be configured to better facilitate the operating characteristics of a particular customer, such as by changing on-the-fly the target LSZ to flush the write data depending on how a customer is currently accessing the NVSM (e.g., to reduce access latency or adjacent track interference (ATI)), or by flushing at least some of the write data to a non-volatile semiconductor memory, such as a Flash memory, in order to improve performance based on the needs of each customer.

In the above described embodiments, the example customer is a manufacturer of video surveillance systems that may benefit from the data storage device accessing the NVSM in ways that improve performance, such as by identifying and managing AUs so as to avoid or reduce garbage collection operations. However, any suitable customer of a data storage device may benefit from the embodiments described herein, such as a manufacturer of smartphones, televisions, autos, aircraft, appliances, etc.

Any suitable NVSM 2 may be employed in the embodiments described herein, such as a magnetic disk or optical disk storage medium, a magnetic tape storage medium, a non-volatile semiconductor storage medium (e.g., flash memory), or a combination of suitable storage mediums. In addition, access to the NVSM 2 may be configured in any suitable manner based on a predicted customer, such as by configuring access to the data tracks of a disk or tape storage medium, or configuring access to the pages of a flash memory.

In one embodiment, the universal firmware including the trained customer prediction model may be loaded into a data storage device as part of a manufacturing procedure. In another embodiment, the universal firmware may be uploaded to the data storage device over the Internet in order to install and/or update the firmware. For example, in one embodiment it may be desirable to reconfigure a customer product, update its operating system, or transfer an older data storage device from an older customer product to a newer customer product. In each of these cases it may be desirable to update the universal firmware in the data storage device (including to update the customer prediction model) in order to re-customize its operation to the new operating environment.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

It is to be understood that the embodiments discussed herein are applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a non-volatile storage medium (NVSM) segmented into a plurality of storage areas to define a write cache storage area and a number of log-structured zone storage areas, wherein each log-structured zone comprises a number of physical block addresses corresponding to a number of logical block addresses in an allocation unit (AU); and
   control circuitry configured to:
      receive a plurality of initial access commands;
      evaluate patterns of the plurality of initial access commands;
      process the plurality of initial access commands using a customer prediction model to predict a customer of the data storage device based on the evaluated commands, wherein the customer prediction model is trained off-line based on access patterns of a plurality of different customers; and
      configure access to the NVSM to redefine one or more of a size of the number of log-structured zone storage areas, a size of the write cache storage area, and a size of the allocation unit based on the predicted customer for subsequent access commands.

2. The data storage device as recited in claim 1, wherein the access patterns used to train the customer prediction model off-line comprises at least one of:
   a logical block address (LBA) range;
   a block size;
   a command type;
   a time interval between access commands; or
   a sequence of access commands.

3. The data storage device as recited in claim 1, wherein the control circuitry is further configured to map each AU to at least one log-structured zone (LSZ) defined within the address range of the NVSM.

4. The data storage device as recited in claim 1, wherein the control circuitry is further configured to:
   prior to processing the plurality of initial access commands, store write data of write operations of the plurality of initial access commands in the write cache storage area the NVSM; and
   after configuring access to the NVSM based on the predicted customer, migrate the write data stored in the write cache storage area to a target area of the NVSM.

5. The data storage device as recited in claim 4, wherein the target area of the NVSM corresponds to an allocation unit (AU) of the predicted customer.

6. The data storage device as recited in claim 4, wherein after migrating the write data stored in the write cache, the control circuitry is further configured to configure access to the NVSM by adjusting the size of the write cache based on the predicted customer.

7. The data storage device as recited in claim 1, wherein the access patterns used to train the customer prediction model are compared to the evaluated patterns.

8. The data storage device as recited in claim 1, wherein the NVSM further comprises an operating system storage area.

9. A data storage device comprising:
   a non-volatile storage medium (NVSM) segmented into a plurality of storage areas to define a write cache storage area and a number of loci-structured zone storage areas, wherein each log-structured zone comprises a number of physical block addresses corresponding to a number of logical block addresses in an allocation unit (AU); and
   control circuitry configured to:
      receive write data for a plurality of initial write commands;
      store the write data in a write cache;
      evaluate patterns of the plurality of initial write commands;
      process the plurality of initial write commands using a customer prediction model to predict a customer of the data storage device based on the evaluated commands;
      configure access to the NVSM based on the predicted customer to redefine one or more of a size of the number of log-structured zone storage areas and a size of the allocation unit for subsequent write commands; and
      after configuring access to the NVSM based on the predicted customer, migrate the write data from the write cache storage area to a target area of the NVSM.

10. The data storage device as recited in claim 9, wherein the customer prediction model is trained off-line based on access patterns of a plurality of different customers.

11. The data storage device as recited in claim 10, wherein the access patterns used to train the customer prediction model off-line comprises at least one of:
   a logical block address (LBA) range;
   a block size;

a command type;
a time interval between access commands; or
a sequence of access commands.

12. The data storage device as recited in claim 10, wherein the access patterns used to train the customer prediction model are compared to the evaluated patterns.

13. The data storage device as recited in claim 9, wherein the control circuitry is further configured to map each AU to at least one log-structured zone (LSZ) defined within the address range of the NVSM.

14. The data storage device as recited in claim 9, wherein the target area of the NVSM corresponds to one of the AUs.

15. The data storage device as recited in claim 9, wherein after migrating the write data stored in the write cache storage area, the control circuitry is further configured to configure access to the NVSM by adjusting a size of the write cache storage area based on the predicted customer.

16. A data storage device comprising:
a non-volatile storage medium (NVSM) segmented into a plurality of storage areas to define a write cache storage area and a number of log-structured zone storage areas, wherein each log-structured zone comprises a number of physical block addresses corresponding to a number of logical block addresses in an allocation unit (AU);
a means for receiving a plurality of initial access commands;
a means for evaluating patterns of the plurality of initial access commands;
a means for processing the plurality of initial access commands using a customer prediction model to predict a customer of the data storage device based on the evaluated commands; and
a means for configuring access to the NVSM based on the customer prediction model, the customer prediction model being trained off-line based on access patterns of a plurality of different customers, wherein the means for configuring access to the NVSM is configured to redefine one or more of a size of the number of log-structured zone storage areas, a size of the write cache storage area, and a size of the allocation unit for subsequent access commands.

17. The data storage device as recited in claim 16, wherein the access patterns used to train the customer prediction model off-line comprises at least one of:
a logical block address (LBA) range;
a block size;
a command type;
a time interval between access commands; or
a sequence of access commands.

18. The data storage device as recited in claim 16, wherein the control circuitry is further configured to map each AU to at least one log-structured zone (LSZ) defined within the address range of the NVSM.

19. The data storage device as recited in claim 16, wherein the access patterns used to train the customer prediction model are compared to the evaluated patterns.

* * * * *